(12) United States Patent
Locker et al.

(10) Patent No.: US 10,445,488 B2
(45) Date of Patent: Oct. 15, 2019

(54) INTUITIVE TOUCH GESTURE-BASED DATA TRANSFER BETWEEN DEVICES

(71) Applicant: Lenovo (Singapore) Pte. Ltd., Singapore (SG)

(72) Inventors: Howard Locker, Cary, NC (US); Daryl Cromer, Cary, NC (US); John Weldon Nicholson, Cary, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 419 days.

(21) Appl. No.: 13/854,610

(22) Filed: Apr. 1, 2013

(65) Prior Publication Data

US 2014/0292669 A1    Oct. 2, 2014

(51) Int. Cl.
| | | |
|---|---|---|
| *G06F 21/44* | (2013.01) | |
| *G06F 3/01* | (2006.01) | |
| *G06F 21/35* | (2013.01) | |
| *H04L 29/06* | (2006.01) | |
| *G06F 3/0488* | (2013.01) | |
| *G06F 3/0484* | (2013.01) | |
| *H04W 12/06* | (2009.01) | |
| *H04L 29/08* | (2006.01) | |
| *H04W 12/00* | (2009.01) | |

(52) U.S. Cl.
CPC .............. *G06F 21/44* (2013.01); *G06F 3/017* (2013.01); *G06F 3/04842* (2013.01); *G06F 3/04883* (2013.01); *G06F 21/35* (2013.01); *H04L 63/18* (2013.01); *H04W 12/06* (2013.01); *G06F 2203/04808* (2013.01); *H04L 67/06* (2013.01); *H04W 12/00508* (2019.01)

(58) Field of Classification Search
CPC . H04L 63/0876; H04L 63/0854; H04L 63/18; H04L 67/06; G06F 3/04883; G06F 21/35; G06F 21/31; G06F 21/44; G06F 3/04842; G06F 3/017; G06F 2203/04808; H04W 12/06; H04W 12/00508
USPC ..................... 345/173; 709/217–219; 726/20
See application file for complete search history.

(56) References Cited

U.S. PATENT DOCUMENTS

| | | | | |
|---|---|---|---|---|
| 8,260,883 B2 * | 9/2012 | Mooring | ............... | H04W 4/206 345/173 |
| 8,532,675 B1 * | 9/2013 | Pasquero | .......... | H04M 1/72572 345/158 |
| 2002/0197956 A1 | 12/2002 | Annola et al. | | |

(Continued)

FOREIGN PATENT DOCUMENTS

| | | |
|---|---|---|
| CN | 101398732 A | 4/2009 |
| CN | 101997885 A1 | 3/2011 |

(Continued)

*Primary Examiner* — Ibrahim A Khan
(74) *Attorney, Agent, or Firm* — Ference & Associates LLC

(57) ABSTRACT

An embodiment provides a method, including: receiving, at a network device, data from a source device and a user identification derived from a user device; storing, at the network device, the data from the source device; detecting, at the network device, a request from a destination device, the request from the destination device comprising a request for data derived from gesture input and associated with the user identification derived from the user device; and transferring, from the network device to the destination device, the data from source device. Other aspects are described and claimed.

19 Claims, 2 Drawing Sheets

(56) References Cited

U.S. PATENT DOCUMENTS

| | | | | |
|---|---|---|---|---|
| 2003/0182326 A1* | 9/2003 | Patterson | ............ | G06F 11/1464 |
| 2004/0133653 A1* | 7/2004 | Defosse | ................ | G06Q 20/04 |
| | | | | 709/217 |
| 2004/0190038 A1* | 9/2004 | Shahindoust | ....... | G07F 17/0014 |
| | | | | 358/1.14 |
| 2007/0124503 A1 | 5/2007 | Ramos et al. | | |
| 2009/0015374 A1* | 1/2009 | Ghosh | .................... | G06F 21/35 |
| | | | | 340/5.64 |
| 2011/0093941 A1* | 4/2011 | Liu | .................... | G06F 9/44505 |
| | | | | 726/7 |
| 2011/0103586 A1* | 5/2011 | Nobre | ................ | H04L 63/0853 |
| | | | | 380/270 |
| 2011/0187497 A1* | 8/2011 | Chin | ......... | H04L 9/32 |
| | | | | 340/5.54 |
| 2011/0251954 A1* | 10/2011 | Chin | .................. | G06F 3/04883 |
| | | | | 705/40 |
| 2012/0096368 A1* | 4/2012 | McDowell | ............. | G06F 9/543 |
| | | | | 715/748 |
| 2012/0110470 A1* | 5/2012 | Mistry | .................. | G06F 3/0486 |
| | | | | 715/748 |
| 2013/0169546 A1* | 7/2013 | Thomas | ................ | G06F 9/4451 |
| | | | | 345/173 |
| 2013/0174252 A1* | 7/2013 | Weber | ................ | G06F 21/6218 |
| | | | | 726/20 |
| 2013/0268758 A1* | 10/2013 | Schrecker | ............... | G06F 21/00 |
| | | | | 713/168 |
| 2014/0115116 A1* | 4/2014 | Motes | ..................... | H04L 67/02 |
| | | | | 709/219 |
| 2014/0181157 A1* | 6/2014 | Houston | ................ | G06F 16/22 |
| | | | | 707/812 |

FOREIGN PATENT DOCUMENTS

| | | |
|---|---|---|
| CN | 102457295 A | 5/2012 |
| CN | 102646012 A | 8/2012 |
| CN | 102685175 A | 9/2012 |
| CN | 102710744 A | 10/2012 |
| CN | 103002030 A | 3/2013 |

* cited by examiner

INTUITIVE TOUCH GESTURE-BASED DATA TRANSFER BETWEEN DEVICES

BACKGROUND

Transferring files or data between multiple devices is a complex process and often a non-intuitive process. It requires applications, infrastructure, knowledge, or work on the part of the user. There are several existing methods to transfer files between devices, including some that are more intuitive to use than others. Often users either email the file or data object or transfer it using a chat session. Both of these transfer techniques require knowledge and work by the user.

Another example that is somewhat more intuitive is the application that transfers files between devices if the devices each have the appropriate application installed and running, have identified a file to send from one device to the other, and then physically bump the devices together. This application triggers transfer in response to accelerometer data. Although there are many existing file and data transfer protocols, each has significant drawbacks and shortcomings.

BRIEF SUMMARY

In summary, one aspect provides a method, comprising: receiving, at a source device, information from a user device identifying a user; receiving, at the source device, selecting data derived from gesture input to be transferred to a destination device; and sending, to a network device, the data selected and a user identification derived from the user device.

Another aspect provides a method, comprising: receiving, at a network device, data from a source device and a user identification derived from a user device; storing, at the network device, the data from the source device; detecting, at the network device, a request from a destination device, the request from the destination device comprising a request for data derived from gesture input and associated with the user identification derived from the user device; and transferring, from the network device to the destination device, the data from source device.

A further aspect provides an information handling device, comprising: one or more processors; and a memory operatively coupled to the one or more processors that stores instructions executable by the one or more processors to perform acts comprising: receiving data from a source device and a user identification derived from a user device; storing the data from the source device; detecting a request from a destination device, the request from the destination device comprising a request for data derived from gesture input and associated with the user identification derived from the user device; and transferring the data from source device.

A further aspect provides a program product, comprising: a storage medium having computer program code embodied therewith, the computer program code comprising: computer program code configured to receive, at a network device, data from a source device and a user identification derived from a user device; computer program code configured to store, at the network device, the data from the source device; computer program code configured to detect, at the network device, a request from a destination device, the request from the destination device comprising a request for data derived from gesture input and associated with the user identification derived from the user device; and computer program code configured to transfer, from the network device to the destination device, the data from source device.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

Conventional file and data transfer protocols and mechanisms have drawbacks, making them non-intuitive and thus difficult to use, or cumbersome and requiring specialized knowledge or techniques to be applied by the user. Often times, these are difficult for the user to remember or even impossible to perform. For example, with respect to using a data transfer protocol using a bump between two devices, a drawback of this approach is that it does not apply for devices which are large or difficult to physically move or which do not have accelerometers (e.g., all-in-one desktop computers, or kiosks or the like). Another drawback is that both devices need to be in the same place, i.e., excluding a transfer between remote devices such as at work and at home.

An embodiment provides an intuitive, easy to use transfer of data, for example a file or a portion thereof, between user devices. As used herein, an "object" is data, such as a file, a portion of a file, an application, or the like that is to be transferred. Embodiments implement gesture recognition technology and incorporate this technology into file transfer mechanisms. Embodiments therefore offer users easy to remember and intuitive mechanisms by which files or other data objects may be transferred between various devices.

The illustrated example embodiments will be best understood by reference to the figures. The following description is intended only by way of example, and simply illustrates certain example embodiments.

Figure 1:
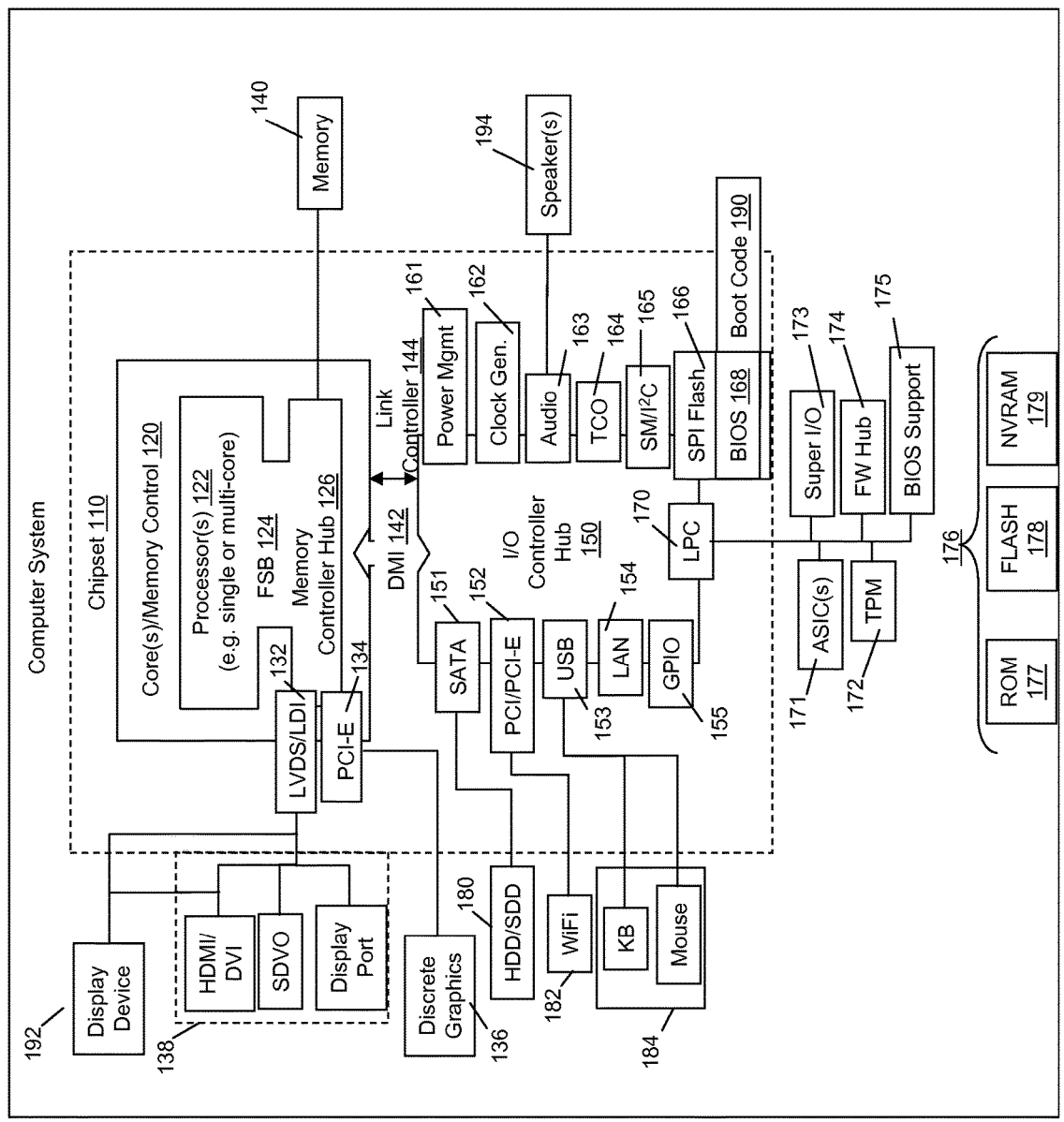
FIG. 1 illustrates an example information handling device and components thereof.

FIG. 1 depicts a block diagram of one example of information handling device ("device") circuits, circuitry or components. The example depicted in FIG. 1 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 1.

The example of FIG. 1 includes a so-called chipset 110 (a group of integrated circuits, or chips, that work together, chipsets) with an architecture that may vary depending on manufacturer (for example, INTEL, AMD, ARM, etc.). The architecture of the chipset 110 includes a core and memory control group 120 and an I/O controller hub 150 that exchanges information (for example, data, signals, commands, et cetera) via a direct management interface (DMI) 142 or a link controller 144. In FIG. 1, the DMI 142 is a chip-to-chip interface (sometimes referred to as being a link between a "northbridge" and a "southbridge"). The core and memory control group 120 include one or more processors 122 (for example, single or multi-core) and a memory controller hub 126 that exchange information via a front side bus (FSB) 124; noting that components of the group 120 may be integrated in a chip that supplants the conventional "northbridge" style architecture.

In FIG. 1, the memory controller hub 126 interfaces with memory 140 (for example, to provide support for a type of RAM that may be referred to as "system memory" or "memory"). The memory controller hub 126 further includes a LVDS interface 132 for a display device 192 (for example, a CRT, a flat panel, touch screen, et cetera). A block 138 includes some technologies that may be supported via the LVDS interface 132 (for example, serial digital video, HDMI/DVI, display port). The memory controller hub 126 also includes a PCI-express interface (PCI-E) 134 that may support discrete graphics 136.

In FIG. 1, the I/O hub controller 150 includes a SATA interface 151 (for example, for HDDs, SDDs, 180 et cetera), a PCI-E interface 152 (for example, for wireless connections 182), a USB interface 153 (for example, for devices 184 such as a digitizer, touch screen, keyboard, mice, cameras, phones, microphones, storage, other connected devices, et cetera), a network interface 154 (for example, LAN), a GPIO interface 155, a LPC interface 170 (for ASICs 171, a TPM 172, a super I/O 173, a firmware hub 174, BIOS support 175 as well as various types of memory 176 such as ROM 177, Flash 178, and NVRAM 179), a power management interface 161, a clock generator interface 162, an audio interface 163 (for example, for speakers 194), a TCO interface 164, a system management bus interface 165, and SPI Flash 166, which can include BIOS 168 and boot code 190. The I/O hub controller 150 may include gigabit Ethernet support.

The system, upon power on, may be configured to execute boot code 190 for the BIOS 168, as stored within the SPI Flash 166, and thereafter processes data under the control of one or more operating systems and application software (for example, stored in system memory 140). An operating system may be stored in any of a variety of locations and accessed, for example, according to instructions of the BIOS 168. As described herein, a device may include fewer or more features than shown in the system of FIG. 1.

Devices, as for example outlined in FIG. 1, may include user devices such as a laptop or desktop computing system and/or other user devices, such as tablet computing devices, e-readers, smart phones, and the like. Although the exact circuitry may differ, for example many smart phones and small mobile devices implement system-on-chip designs; the operational principles of the various example embodiments are applicable to all such devices.

Figure 2:
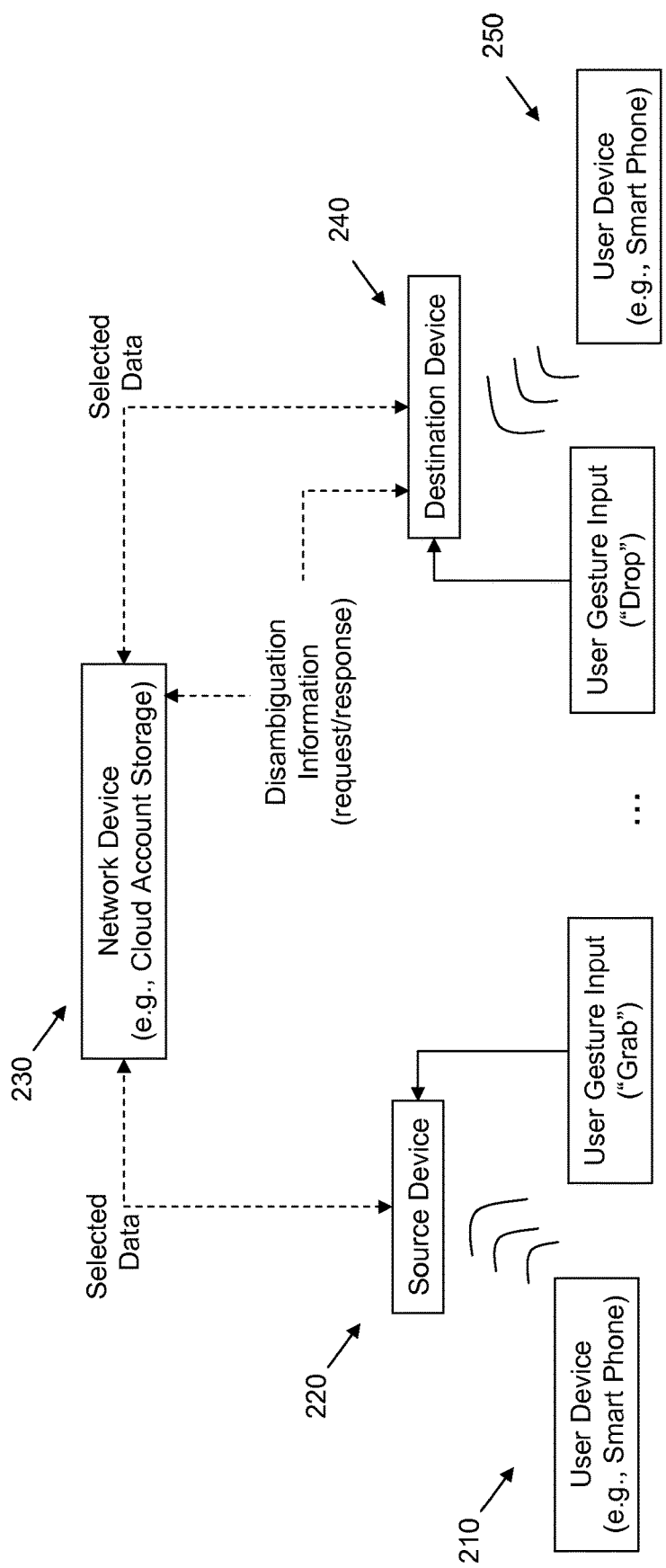
FIG. 2 illustrates an example method of and operating environment for data transfer between devices.

An embodiment implements gesture recognition to act as a triggering mechanism for data transfer. Referring to FIG. 2, for example, a user may make a physical "grab" touch gesture on the first device 220. The gesture may include selecting the object for transfer. The gesture may be detected utilizing a variety of mechanisms. For example, a gesture may be detected using a touch screen of the device 220, using optical technology (e.g., infrared cameras detecting a gesture above the touch screen of the device 220) or any suitable gesture recognition technology.

Suitable grab gestures may take a variety of forms but will benefit from being intuitive to the user. For example, a grab gesture may include a five-finger grab, simulating picking up a tangible object with a single hand. Gestures of this type may be detected using touch screens, hover-enabled touch screens, and/or two dimensional or three dimensional cameras. Accordingly, optical technology may be incorporated into the device 220, enabling varying levels (on the order of feet) at which the user may provide gesture input relative to a device 220. For touch screens the gesture may be implemented using finger pinch gestures or like touch based gestures (e.g., placing a hand on screen and pinching over object with all five fingers, two fingers or the like). Thus, a user may simply pinch over the object he or she wants to "grab". For optical or camera sensed gestures, a user may perform the same gesture as when physically touching the screen or additional gestures owing to the increased distance the user inputs may be detected at. For example, a user may perform additional gestures, e.g., at a height on the order of feet (e.g., 3-10 feet) away from the device, as further described herein.

For drop gestures a reverse or opposite of a grab gesture may be used. For example, to drop (and thus transfer) data, a user may provide a reverse pinching gesture on the touch screen of a device 240. Thus, a user wishing to drop an object on a destination device 240 may start with a pinched hand and open his or her hand over a part of screen where he or she wants to drop object.

For detecting the gestures accurately, an embodiment may provide for disambiguation. For example, for both a grab and a drop gesture, an embodiment may provide some level of feedback to ensure the gesture is appropriately interpreted. Thus, an embodiment may query the user (e.g., via a pop up window or the like inviting user interaction) to confirm the selection or gesture action. Additional confirmation or disambiguation mechanisms may be employed. For example, in the case of multiple objects that may be indicated for a drop, as further described herein, a popup window or other invitation for user input may be provided at the destination device 240 to determine which object(s) should be transferred.

The "grab" or selection gesture may take a variety of forms. For example, the selection gesture may be a selection of an entire file. This may be detected for example on a touch screen via detecting a select and hold gesture at the source device 220. The grab or selection gesture may be of a portion of the file or the screen. For example, a user may make a gesture selection of a portion of an open file. This may be accomplished in a variety of ways, e.g., via the user drawing out or highlighting what he or she wants to select.

At some point thereafter, the user goes to the second device 240 (the device the data is to be transferred to) and does a physical "drop" gesture. Similar to the "grab" or select gesture, the drop gesture at the second device 240 may take a variety of forms and may be detected using a variety of gesture recognition techniques. The drop gesture will cause a digital object (e.g., file, application, portion of a file, data, etc.) to be transferred (e.g., copied and transferred, cut and transferred, etc.) between the devices 220 and 240. The transfer is seamless from the viewpoint of the user because each device involved in the transfer includes a transfer application.

As a specific example, a user may "grab" an object on a source device 220 using a touch gesture on the source device 220. The source device 220 detects the user's identification (e.g., via a user device 210 such as a smart phone or other device pairing and/or using industry standard personal area networks). A source device 220 may act as a user device 210 for identification. Accordingly, the source device 220 is able to identify the user providing the grab gesture. For example, if the user is carrying his or her smart phone 210, with BLUETOOTH short range wireless pairing between the user's smart phone 210 and the source device 220, user identification may be made. For example, within such a pairing is enough information (e.g., MAC address, phone number, etc.) that is transferred from the smart phone 210 to the source device 220 to uniquely identify the smart phone 210 and thus the user.

The source device 220 then sends the selected data (indicated by the grab gesture) to the destination device 240. The destination device 240 may be a directly connected device, or intermediary device(s) 230 may be involved in the transfer mechanism.

An example of an intermediary device 230 is a "cloud" device (or collection of devices) or service to which the object (e.g., data or file or portion of a file that was selected by the grab gesture) is sent. Along with the data to be transferred (e.g., the file selected by the grab gesture), the unique user identification (e.g., phone number) is sent. This information then may be stored in the cloud device 230 waiting for a future "drop" gesture.

Eventually the user moves to the destination device 240. The "drop" gesture is performed at the destination device 240. The destination device 240 also detects the user's identity in a similar fashion as the source device. For example, the destination device 240 may detect a user device 250 (e.g., a smart phone or tablet computer of the user) by pairing and/or using industry standard personal area networks. The destination device 240 then sends to the cloud device 230 the unique identification (e.g., phone identification) and queries the cloud device 230 for any object(s) waiting for a drop tied to that identification (e.g., tied to the user's phone or tablet, etc., and thus the user).

If the query is successfully answered, the cloud device 230 may then transfer the object to the destination device 240, e.g., using TCPIP data transfers or transfers according to another industry standard protocol. This mechanism may be extended, for example to allow multiple drops of the same object to multiple destination devices. Again, in the case where multiple objects are waiting at the cloud device 230 and could be dropped, a disambiguation query may be posed to the user via the destination device 240. For example, the destination device 240 may be prompted by the cloud storage device 230 to ask the user (e.g., via popup window, audio, etc) of the destination device 240 which of the object(s) are to be dropped. Responsive to user input in response to the disambiguation request, the indicated object(s) may be dropped/transferred.

The application implementing the transfer actions on the destination device 240 may be created in such a way that the application may determine if the object was a file of a particular type, and thus where or how to store it, or a portion of the screen, etc., according to predetermined or learned policies. For example, if the object is a portion of the screen data from the source device 220, then the object may be a pasted into an open window on the destination device 240. Some or all of the devices (e.g., the source 220, destination 240, network 230 and user identification device(s) 210, 250) may implement some or all of the application features (e.g., "grab", "drop", identification, disambiguation, and/or transfer application actions). An embodiment is particularly useful in transferring data between distant or remotely located devices and/or transferring data in a delayed manner via linkage to a common cloud account implementation.

Embodiments may support additional gesture actions to provide for transfers. For example, a pass gesture and a catch gesture, as for example sensed through optical sensor(s) may be implemented. In such a scenario, a user may "pass" a selected object to transfer to the "catching" user. This may be sensed by a first device. The pass and catch gestures act to assign the object for transfer to the catching user. This information again may be coordinated via a cloud device or service such that, at a destination device, a drop gesture completes the transfer action, as described herein. Again, by using different sensors, e.g., optical sensors, gestures such as pass and catch gestures may be detected and interpreted at various levels, e.g., 3-10 feet from the sensors in use. This facilitates more interactive and intuitive gesture based transfers.

Accordingly, an embodiment provides an intuitive mechanism for data transfer between devices. In one embodiment, a user's personal device(s) is/are used for user identification in connection with convenient gesture based input for data transfer. It should be noted that user devices 210 and 250 of FIG. 2 may be the same or different devices (e.g., the same phone used at two different times, or two different devices such as a smart phone and a tablet).

The data transfer may be facilitated using an intermediary device such as a cloud-computing device. The data transfer may be discontinuous, for example via storage of pending transfer data at a cloud device. Gesture based technology may be utilized and may be combined with disambiguation techniques to ensure a convenient and accurate user experience when performing data transfers.

While the various example embodiments have been described in connection with personal computing devices used for data transfer in specific scenarios, these were provided as non-limiting examples. Accordingly, embodiments may be used to transfer data in similar contexts or scenarios. Similarly, although devices such as desktop computing devices and mobile phones have been used in the description as specific examples, embodiments may be utilized in connection with other types of devices, for example, laptop computers, tablet computers, e-readers and the like.

It will also be understood that the various embodiments may be implemented in one or more information handling devices configured appropriately to execute program instructions consistent with the functionality of the embodiments as described herein. In this regard, FIG. 1 illustrates a non-limiting example of such a device and components thereof.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

Any combination of one or more non-signal device readable medium(s) may be utilized. The non-signal medium may be a storage medium. A storage medium may be any non-signal medium, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), a personal area network (PAN), or the connection may be made through other devices (for example, through the Internet using an Internet Service Provider) or through a hard wire connection, such as over a USB connection.

Aspects are described herein with reference to the figures, which illustrate example methods, devices and program products according to various example embodiments. It will be understood that the actions and functionality illustrated may be implemented at least in part by program instructions. These program instructions may be provided to a processor of a general purpose information handling device, a special purpose information handling device, or other programmable data processing device or information handling device to produce a machine, such that the instructions, which execute via a processor of the device implement the functions/acts specified.

The program instructions may also be stored in a device readable medium that can direct a device to function in a particular manner, such that the instructions stored in the device readable medium produce an article of manufacture including instructions which implement the function/act specified.

The program instructions may also be loaded onto a device to cause a series of operational steps to be performed on the device to produce a device implemented process such that the instructions which execute on the device provide processes for implementing the functions/acts specified.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
   receiving, at a network device, data from a source device;
   receiving, at the network device, a first identification of a user from the source device;
   wherein the data from the source device comprises data issued in response to a detection of a three dimensional gesture performed by the user at the source device and wherein the data and the three dimensional gesture are associated with the user based upon the first identification;
   storing, at the network device, the data from the source device;
   detecting, at the network device, a request from a destination device, the request from the destination device comprising a second identification of the user occurring at the destination device and wherein the request is in response to detection of a second three dimensional gesture performed by the user at the destination device;
   transferring, based upon the request and from the network device to the destination device, the data from the source device based upon the first identification of the user identifying the user as the same user identified from the second identification of the user.

2. The method of claim 1, wherein the source device comprises a first user device, the destination device comprises a second user device, and the network device comprises a cloud network device.

3. The method of claim 1, wherein the data from the source device comprises an object selected from the group consisting of a file, a portion of a file, and an application.

4. The method of claim 1, wherein the request from a destination device comprises a recognized catch gesture of a user detected using an optical sensor of the destination device and associated with the second identification of the user, and further wherein the recognized pass gesture and the recognized catch gesture identifies an assignment of an object to be transferred between user devices.

5. A method, comprising:
   receiving, at a network device, data from a source device;
   receiving, at the network device, an identification of a user from the source device;
   wherein the data from the source device comprises data issued in response to a detection of a three dimensional gesture performed by the user at the source device and wherein the data and the three dimensional gesture are associated with the user based upon the first identification;
   storing, at the network device, the data from the source device;
   detecting, at the network device, a request from a destination device in response to a second three dimensional gesture occurring at the destination device, the request from the destination device comprising a second identification of the user and a request for data associated with the three dimensional gesture and based upon the second identification of the user identifying the same user identified from the first identification of the user; and transferring, based upon the request and from the network device to the destination device, the data from source device.

6. The method of claim 5, wherein the source device comprises a first user device, the destination device comprises a second user device, and the network device comprises a cloud network device.

7. The method of claim 5, wherein the data from the source device comprises an object selected from the group consisting of a file, a portion of a file, and an application.

8. The method of claim 7, further comprising, in response to the request for data associated with the identification of the user, determining, at the network device, that more than one object is pending for the user device.

9. The method of claim 8, further comprising sending, from the network device to the destination device, a disambiguation request for identification of one or more object included in the more than one object pending for the user device.

10. The method of claim 9, further comprising:
receiving a response from the destination device comprising disambiguation information, wherein the transferring of the data, from the network device to the destination device, occurs in response to the disambiguation information.

11. The method of claim 5, wherein:
the request from the destination device comprises data derived from a recognized catch gesture of a second user detected using an optical sensor of the destination device, and further wherein the recognized pass gesture and the recognized catch gesture identifies an assignment of an object to be between user devices.

12. An information handling device, comprising:
one or more processors; and
a memory operatively coupled to the one or more processors that stores instructions executable by the one or more processors to:
receive data from a source device;
receive a first identification of a user from the source device;
wherein the data from the source device comprises data issued in response to a detection of a three dimensional gesture performed by the user at the source device and wherein the data and the three dimensional gesture are associated with the user based upon the first identification;
store the data from the source device;
detect a request from a destination device, the request from the destination device comprising a second identification of the user occurring at the destination device and wherein the request is in response to detection of a second three dimensional gesture performed by the user at the destination device; and
transfer, based upon the request, the data from source device based upon the first identification of the user identifying the user as the same user identified from the second identification of the user.

13. The information handling device of claim 12, wherein the source device comprises a first user device, the destination device comprises a second user device, and the information handling device comprises a cloud network device.

14. The information handling device of claim 12, wherein the data from the source device comprises an object selected from the group consisting of a file, a portion of a file, and an application.

15. The information handling device of claim 14, wherein the instructions are executable by the processor to, in response to the request for data associated with the identification of the user, determine, at the information handling device, that more than one object is pending for the user device.

16. The information handling device of claim 15, wherein the instructions are executable by the processor to send, from the information handling device to the destination device, a disambiguation request for identification of one or more object include in the more than one object pending for the user device.

17. The information handling device of claim 16, wherein the instructions are executable by the processor to:
receive a response from the destination device comprising disambiguation information.

18. The information handling device of claim 17, wherein the data transfer, from the information handling device to the destination device, occurs in response to the disambiguation information.

19. A program product, comprising:
a storage device having computer program code embodied therewith, the computer program code being executable by a processor and comprising:
computer program code that receives, at a network device, data from a source device;
computer program code that receives, at a network device, a first identification of a user from the source device;
wherein the data from the source device comprises data issued in response to a detection of a three dimensional gesture performed by the user at the source device and wherein the data and the three dimensional gesture are associated with the user based upon the first identification;
computer program code that stores, at the network device, the data from the source device;
computer program code that detects, at the network device, a request from a destination device comprising a second identification of the user occurring at the destination device and wherein the request is in response to detection of a second three dimensional gesture performed by the user at the destination device; and
computer program code that transfers, based upon the request and from the network device to the destination device, the data from source device based upon the first identification of the user identifying the user as the same user identified from the second identification of the user.

* * * * *